United States Patent [19]
Guettier

[11] 3,850,268
[45] Nov. 26, 1974

[54] SELF-LOCKING DISC BRAKE MECHANISM

[75] Inventor: Michel Guettier, Rueil-Malmaison, France

[73] Assignees: Regie Nationale des Usines Renault, Boulogne-Billancourt; Automobiles Peugeot, Paris, both of, France

[22] Filed: July 10, 1973

[21] Appl. No.: 377,935

[30] Foreign Application Priority Data
July 19, 1972 France .............................. 72.26083

[52] U.S. Cl.............. 188/72.2, 188/71.8, 188/72.7, 188/72.9, 188/79.5 GE, 188/196 V, 188/196 B, 192/70.24, 192/70.3, 192/111 A
[51] Int. Cl........................................... F16d 55/46
[58] Field of Search.. 188/79.5 GE, 196 B, 196 BA, 188/196 V, 72.2, 72.7, 72.6, 72.9, 71.8, 73.4; 192/70.24, 70.3, 111 A

[56] References Cited
UNITED STATES PATENTS

| | | | |
|---|---|---|---|
| 2,170,893 | 8/1939 | Gallup | 188/72.2 X |
| 3,315,769 | 4/1967 | Francois | 188/72.2 |
| 3,318,421 | 5/1967 | VanHouse et al. | 188/72.6 X |
| 3,626,485 | 12/1971 | Holloway | 188/72.2 |
| 3,664,469 | 5/1972 | Maurice | 188/72.9 |
| 3,708,040 | 1/1973 | Hollnagal | 188/72.2 |

FOREIGN PATENTS OR APPLICATIONS

| | | | |
|---|---|---|---|
| 788,841 | 1/1958 | Great Britain | 188/72.2 |
| 1,128,671 | 10/1968 | Great Britain | 188/72.2 |

Primary Examiner—George E. A. Halvosa
Attorney, Agent, or Firm—Strauch, Nolan, Neale, Nies & Kurz

[57] ABSTRACT

In the illustrative embodiments disclosed, a self-locking disc brake mechanism of a construction particularly suited for use as a vehicle parking brake includes a pair of operatively interconnected brake shoes, one of which is mounted on either side of the brake disc. Upon actuation of the brake, the shoes are moved to mutually opposed braking positions in contact with the sides of the disc. One of the shoes is further adapted for limited lateral movement, in response to rotation of the disc while the shoe is in the braking position, in the direction of rotation of the disc. A pivotal cam member coacts with a cam surface on the laterally movable shoe to urge the shoe still more forcibly against the disc upon the occurrence of such lateral movement. By virtue of the interconnection between the shoes, this also produces a greater braking force on the other shoe, with the result that the disc tends to be locked between the shoes against further rotation.

2 Claims, 4 Drawing Figures

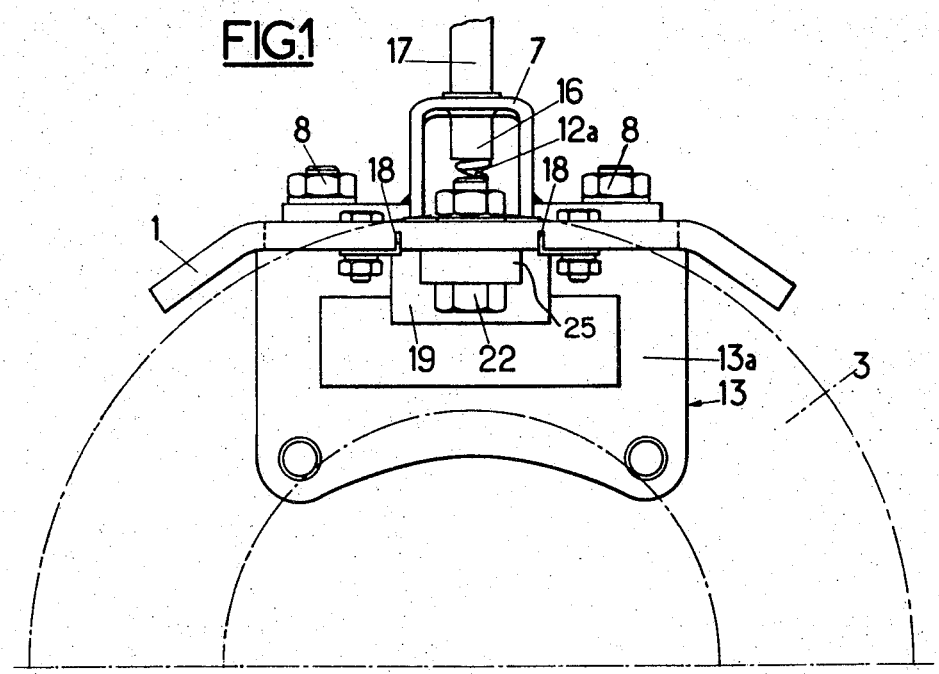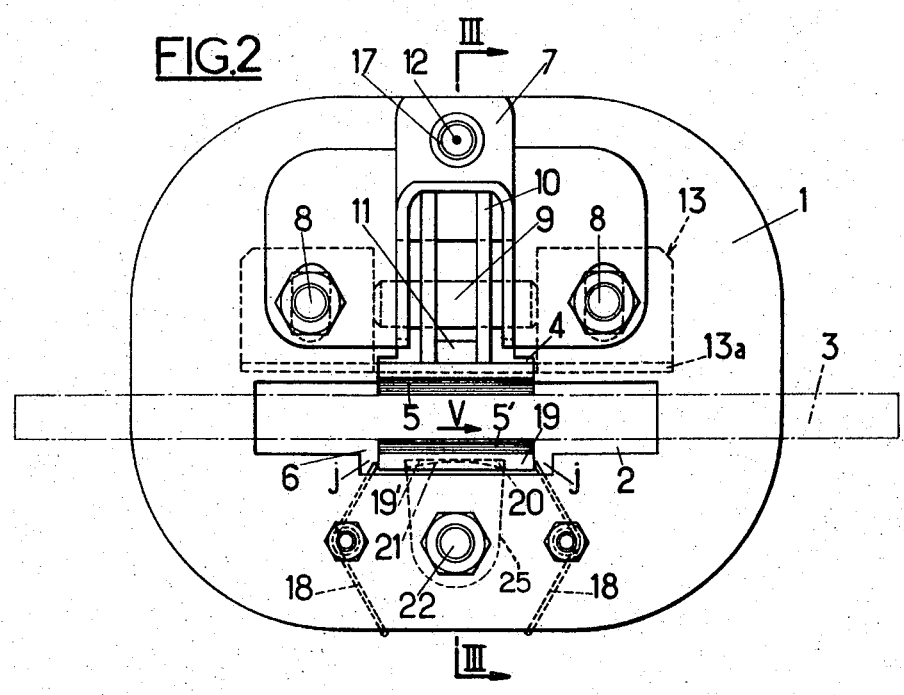

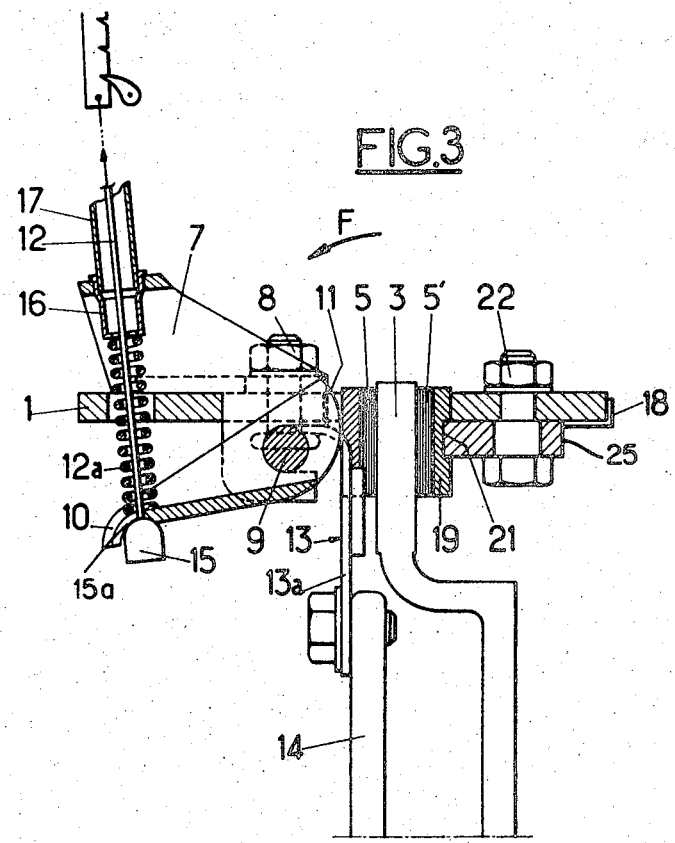
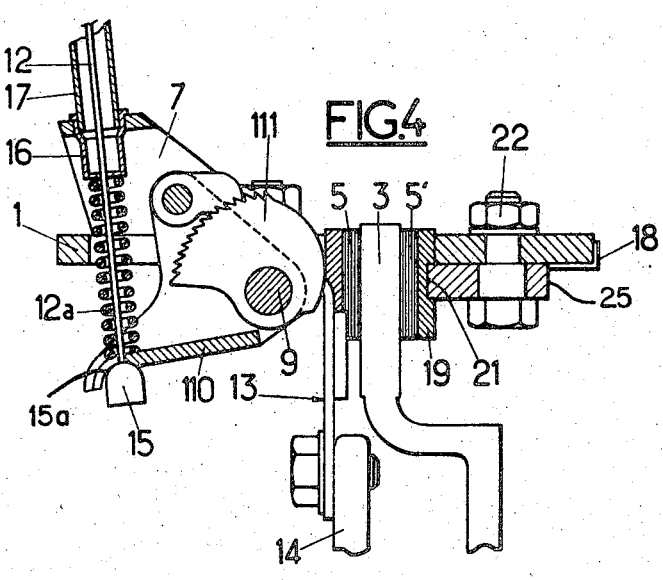

SELF-LOCKING DISC BRAKE MECHANISM

BACKGROUND OF THE INVENTION

Field of the Invention

The present invention relates generally to brake mechanisms of the disc type and, more particularly, to self-locking brake mechanisms adapted for use in connection with an emergency or parking brake for a vehicle equipped with disc-type brakes.

The Prior Art

Auxiliary brake mechanisms for vehicles, and particularly automobile parking brake mechanisms which are actuated by manipulation of a hand lever located within the passenger compartment of the vehicle, have heretofore required an inordinate amount of pressure to be exerted on the hand lever in order satisfactorily to lock the vehicle brakes when parking, or under emergency stop conditions. As a result, the average operator of a vehicle either fails adequately to set the parking brake when leaving the vehicle unattended in a parking place or is unable to exert sufficient pressure on the brake in an emergency to prevent an accident.

SUMMARY OF THE INVENTION

It is therefore an object of the present invention to provide a braking mechanism for use with a disc-type brake which provides a self-actuated mechanical assistance to increase the braking pressure against the brake disc should the disc begin to rotate while the brake mechanism is engaged, thereby tending to lock the brake disc against further rotation.

Another object of the invention is to provide such increased braking pressure substantially simultaneously on both brake shoes.

Still another object of the invention is to provide an adjustable brake mechanism to compensate for brake shoe wear during operation.

The present invention, while not limited to use in connection with automobiles, is particularly advantageous in that respect, and provides generally a self-locking disc-type brake mechanism of the type which affords a supplemental mechanical assistance to facilitate the application of sufficient braking pressure to the brake disc.

More specifically, one embodiment of a brake mechanism constructed in accordance with the invention includes a pair of operatively interconnected brake shoes mounted on opposite sides of the brake disc and adapted for movement, upon actuation of the brake, to braking positions in contact with the sides of the disc. A supplemental mechanical assist or self-locking mechanism, operable upon rotation of the disc when the shoes are in braking positions, is also provided to increase the braking pressure exerted by the shoes, thus tending to lock the disc against further rotation.

In a preferred form of self-locking mechanism, one brake shoe is mounted for limited lateral movement along with and substantially in the direction of rotation of the disc against the force of resilient members tending to return the shoe to its normal rest position. A cam member pivotally carried by the brake shoe supporting structure coacts with a cooperating surface on the brake shoe to urge the shoe towards the disc upon lateral movement of the shoe. As a consequence, greater braking pressure is applied to the disc by both brake shoes, due to their operative interconnection, and the disc is thereby locked against further rotation. Advantage may be taken of this self-locking feature by intentionally allowing or causing the brake disc to rotate at the time the brake is actuated.

In accordance with another feature of the invention, the brake mechanism may include a capability for allowing adjustment of the mechanism to account for wear of the brake shoes.

BRIEF DESCRIPTION OF THE DRAWINGS

For a further understanding of the invention, reference may be had to the accompanying drawings, in which:

FIG. 1 is a side elevational view of a self-locking parking brake in accordance with the present invention;

FIG. 2 is a plan view of the embodiment of FIG. 1;

FIG. 3 is a vertical sectional view taken along the lines III—III of FIG. 2; and FIG. 4 is a view similar to FIG. 3, showing structure for permitting adjustment of the brake mechanism to account for brake shoe wear.

BRIEF DESCRIPTION OF THE PREFERRED EMBODIMENTS

Referring now to the drawings, and in particular to FIGS. 1 and 2, there is illustrated a self-locking disc parking brake including a carrier frame 1, having a longitudinal slot 2, which is adapted to receive a disc 3 of a conventional brake (not shown), which may, for example, be of the yoke type disclosed in French Pat. No. 1,379,032.

The slot 2 of carrier 1 is characterized by a first lateral recess 4 adapted to encompass a first brake shoe 5a having a lining 5. The length of the shoe 5a is approximately the same as the length of the recess portion 4 of slot 2; hence, it is relatively tightly wedged in position against lateral movement relative to the disc. However, it should be recognized that under some circumstances it might be appropriate to adapt the shoe 5a for lateral movement.

A second lateral recess 6 is provided on the opposite side wall of the slot 2 from the first recess 4. This second recess is adapted to receive a second brake shoe 19 having a lining 5'. In the preferred embodiment, the length of the recess 6 is greater than the length of the shoe 19. Thus the second shoe 19 is permitted limited lateral movement within the recess 6 relative to the carrier frame 1. The extent of such movement is limited by the ends of the recess 6, which act as stop surfaces for the shoe 19. The dimensions of the recess are selected to permit lateral movement of the shoe in the direction of rotation of the disc 3, arbitrarily indicated by the arrow V in FIG. 2, through a certain distance determined by the clearance j between the ends of the shoe 19 and the adjacent ends of the recess 6.

It should be noted that while it has been found convenient to provide the stop surfaces as part of the recess 6, other arrangements may be utilized without departing from the scope of the invention. Under some circumstances, for example, it may be appropriate to provide the stop surfaces on a depending flange or other suitably equivalent structure located in the path of lateral movement of the shoe 19.

A bracket 7 is fastened to the carrier 1 by means of bolts 8 and carries a pivot pin 9 of a lever 10. The lever 10 is formed with a cam surface 11 that is adapted to act on the brake shoe 5a to initiate and to sustain the braking action of the mechanism, as described in detail below.

With reference to FIG. 3, the lever 10 is connected by a cable 12 to an actuating member (not shown) which is situated in the driving compartment of the vehicle. A return spring 12a coaxial with the cable 12 is compressed between the bracket 7 and the lever 10 to exert a thrust resisting the pull applied to the cable 12.

The carrier 1 is rigidly connected to the axle bearing carrier 14 of the vehicle by means of a fastening bracket such as the bracket 13. The bracket 13 has a resilient flange 13a, for a purpose which will become apparent. It should be noted, however, that the carrier 1 could just as well be movably installed with respect to the axle bearing carrier by applying the teachings of French Pat. No. 1,379,032, according to which the flange 13a of the fastening bracket may be welded on a tubular member acting as an internal sleeve which slides on the smooth extremity of a pin screwed into the axle bearing carrier.

The end of the cable 12 carries a tip 15 having a semi-circular surface 15a which fits into a correspondingly curved part of the lever 10. The bracket 7 supports the lower extremity 16 of a sheath 17 which surrounds the cable 12. The pull of the cable 12 upwards causes the lever 10 to pivot clockwise (as viewed in FIG. 3) around the pin 9 to bring the cam surface 11 into engagement with the shoe 5a, thereby displacing the brake lining 5 towards and into contact with the disc 3.

As the shoe 5a and its lining 5 are urged into contact with the brake disc 3 under application of the cam surface 11, a reaction force acts simultaneously in the opposite direction against the cam surface 11 and accordingly against the carrier 1. Owing to the inherent flexibility of the supporting flange 13a, the carrier 1 is displaced in the direction indicated by the arrow F in FIG. 3. In this way, the lining 5' of the second shoe 19 is brought into engagement with the brake disc 3 substantially simultaneously with the movement of the actuating shoe.

As a feature of the invention, supplemental mechanical assistance is provided to augment the braking force exerted on the disc 3 by the shoes 5a and 19 in the event that the disc 3 begins to rotate after the shoes 5a and 19 are engaged. This is accomplished through the use of a cam member 25 (see FIGS. 2 and 3) which is pivotally connected to the carrier plate 1 by means of a pivot pin 22. The pivot axis of cam member 25 is substantially perpendicular to the rotational axis of the disc 3.

The cam member 25 is provided at its free end with a cam surface 21 which preferably has a radius of curvature greater than the distance between the center of surface 21 and the pivotal axis of the member 25, so that the distance between the ends of the surface 21 and the pivotal axis will also be larger than the aforementioned center-to-axis distance. The free end of cam member 25 is received in a recess 20 in the rear surface of the shoe 19 such that the cam surface engages and coacts with a cooperating surface 19' on the shoe 19. As shown in FIG. 2, the surface 19' is generally parallel to the surface of the lining 5' and the opposed surface of the disc 3. The depth of recess 20 is sufficient to insure that its lateral ends will engage the adjacent ends of the cam member 25, whereby the cam member will be caused to pivot in response to lateral movement of the shoe 19. Thus the shoe 19, in effect, rides along the cam surface 21.

Lateral movement of the locking shoe 19 occurs when the disc 3 rotates while the brake lining 5' is in braking contact with it. Frictional forces developed at the point of contact between the brake lining 5' and the external surface area of the disc 3 are sufficient to cause the shoe 19 to move laterally with the disc. As the shoe 19 moves laterally in the direction of rotation of the disc 3, the distal portion of the cam surface 21 comes into contact with the shoe and urges it against the brake disc. Because of the curvature of the cam surface 21, the pressure of the shoe against the disc increases to a maximum substantially at the time that the lateral movement is limited by contact of the shoe 19 and the aforesaid stop surface on the carrier 1.

It is significant that while braking pressure on the shoe 19 is gradually increased as a result of the coaction between the cam surface 21 and the surface 19', a reaction force is applied through pivot pin 22 to the carrier 1. The reaction force tends to move the carrier 1 in a direction generally opposite to that indicated by arrow F of FIG. 3. Since the lever arm 10 and its cam surface 11 move along with the carrier 1, the effect of the aforesaid reaction force is to increase pressure from the lever arm 10 on the first shoe 5a and its lining 5. Thus, the braking pressure on the disc 3 is simultaneously applied against both sides of the disc 3, thereby resulting in a highly effective brake system for operation either under emergency stop situations or with respect to normal parking brake operation.

Upon release of the cable 12, the lever 10 is returned by means of spring 12a to its original position, thereby relieving the pressure against the first brake shoe 5a and its lining 5. This enables the carrier 1 to return, by action of the resilient support 13a, to an equilibrium position at which the brake shoes 5a and 19 are in non-braking relation to, i.e., out of contact with, the disc 3.

In the embodiments illustrated in the drawings, a pair of springs 18 of any suitable configuration operate on the second brake shoe 19 to return it, and its associated cam member 25, to its normal rest position opposite the first brake shoe 5a and substantially centered within the recess 6.

FIG. 4 illustrates an alternate embodiment of the actuating mechanism of the invention. This alternate embodiment permits adjustments to be made to allow for wear and tear on the brake linings 5 and 5'. Except as otherwise noted, the components and organization of the brake mechanism are generally the same as in the embodiment of FIGS. 1–3.

In FIG. 4, the integrally-formed lever arm 10 and cam surface 11 are replaced by a separate lever arm 110 and cam plate 111, both of which are supported for independent pivotal movement by the pivot pin 9. As before, the pivot pin 9 preferably is carried by the bracket 7. The cam 111 is provided with a plurality of ratchet teeth 131 adapted to be engaged by a pawl 130, pivoted to the lever arm 110, to lock the cam member 111 is position relative to the lever arm. Cam 111 is provided with a cam surface 132 of predetermined configuration for acting upon the brake shoe 5a and lining 5 in the same manner as previously described in connection with cam surface 11. As will be apparent, this arrangement allows the cam member 111 to be adjusted relative to the brake shoe 5a, so that, as the brake linings wear during use, the cam member 111 may be selectively positioned relative to the lever arm 110 to continue to apply the desired braking force to the disc 3.

It will be understood by those skilled in the art that the above-described embodiments are illustrative only, in that they are susceptible of modification and variation without departing from the spirit and scope of the inventive concepts disclosed. All such modifications and variations, therefore, are intended to be included within the scope of the appended claims.

I claim:

1. A self-energizing brake mechanism for braking a rotatable disc, comprising a floating supporting member freely movable in a direction perpendicular to said disc only, a lever arm rotatably mounted on said supporting member, a first cam rotatably mounted on said supporting member, connecting means for locking said first cam to said lever arm in an adjusted angular relation, a first braking element slidingly mounted on said supporting member for movement perpendicular to said disc only and including resilient means for biasing it away from said disc, the surface of first braking element opposite to said disc being engagable with said first cam so as to be brought into engagement with a face of said disc when said first lever arm is operated, a second braking element mounted on said supporting member on the opposite face of said disc for limited movement tangentially of said disc, and for movement perpendicular to the disc, said second braking element having in its face opposite to said disc a flat bottom recess and including resilient means for biasing it to a position substantially midway of said limited movement, and a second cam rotatably mounted on said supporting member on an axis located in a diametral plane of said disc, said second cam having a cam surface engaging the flat bottom of said recess, said cam surface having a generally curved configuration of a radius greater than the perpendicular distance between said axis and said bottom.

2. The self-energizing brake mechanism according to claim 1, wherein said connecting means for locking said first cam to said lever arm comprises a pawl member pivotally mounted on said lever arm adjacent said first cam and a plurality of ratchet teeth integral with said first cam and selectively engagable with said pawl to lock said first cam with said lever arm in an adjusted angular relation.

* * * * *